(12) United States Patent
McCormick

(10) Patent No.: US 7,073,820 B2
(45) Date of Patent: Jul. 11, 2006

(54) INFLATOR

(75) Inventor: David M. McCormick, St. Clair Shores, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 11/014,642

(22) Filed: Dec. 16, 2004

(65) Prior Publication Data

US 2005/0134031 A1   Jun. 23, 2005

Related U.S. Application Data

(60) Provisional application No. 60/530,215, filed on Dec. 17, 2003.

(51) Int. Cl.
*B60R 21/26* (2006.01)

(52) U.S. Cl. ...................................... 280/741; 280/736

(58) Field of Classification Search ................ 280/736, 280/740, 741, 742; 102/530, 531
See application file for complete search history.

(56) References Cited

U.S. PATENT DOCUMENTS

| | | | | |
|---|---|---|---|---|
| 3,958,949 A | * | 5/1976 | Plantif et al. ................ | 102/531 |
| 4,005,876 A | * | 2/1977 | Jorgensen et al. .......... | 280/741 |
| 5,048,862 A | * | 9/1991 | Bender et al. ............... | 280/741 |
| 5,387,009 A | * | 2/1995 | Lauritzen et al. ........... | 280/736 |
| 5,443,286 A | * | 8/1995 | Cunningham et al. ...... | 280/741 |
| 5,582,427 A | | 12/1996 | Rink et al. ................... | 280/740 |
| 5,584,506 A | * | 12/1996 | Van Wynsberghe ......... | 280/736 |
| 5,772,243 A | * | 6/1998 | Green et al. ................. | 280/741 |
| 5,944,343 A | * | 8/1999 | Vitek et al. .................. | 280/736 |
| 5,951,042 A | * | 9/1999 | O'Loughlin et al. ........ | 280/741 |
| 2005/0134031 A1 | | 6/2005 | McCormick | |
| 2005/0161925 A1 | | 7/2005 | Blackburn ................... | 280/741 |
| 2005/0194772 A1 | | 9/2005 | Numoto et al. ............. | 280/741 |

\* cited by examiner

*Primary Examiner*—David R. Dunn
(74) *Attorney, Agent, or Firm*—L. C. Begin & Associates, PLLC

(57) ABSTRACT

An inflator (10) for a vehicle occupant restraint system. The inflator (10) includes a housing (12) having apertures (13) formed therealong to enable fluid communication between an interior of the housing (12) and an exterior of the housing. A first baffle (14) is positioned in the housing interior. The baffle (14) is spaced apart from the housing (12) to define a fluid channel (33) therebetween in communication with the housing apertures (13). The baffle (14) includes a first opening (17) for fluid communication between an interior of the baffle (14) and the fluid channel (33), and an open end portion for fluid communication between the baffle interior and the baffle exterior. A spacer (18) positioned in the housing interior cavity defines an enclosure (18c) and includes an aperture (19) formed therein for fluid communication between the enclosure (18c) and the open end portion of the baffle. A gas generant (30) is positioned within the spacer enclosure (18c). The gas generant (30) may be a smokeless gas generant composition. An initiator (20) is coupled to the housing (12) for initiating combustion of the gas generant (30) upon activation of the inflator. The inflator (10) provides a continuous, tortuous fluid path through the fluid channel (33) for cooling inflation gases. In addition, the use of a smokeless gas generant composition allows the inflator (10) to operate without the need for a filter to remove particulate materials from the inflation gas.

20 Claims, 3 Drawing Sheets

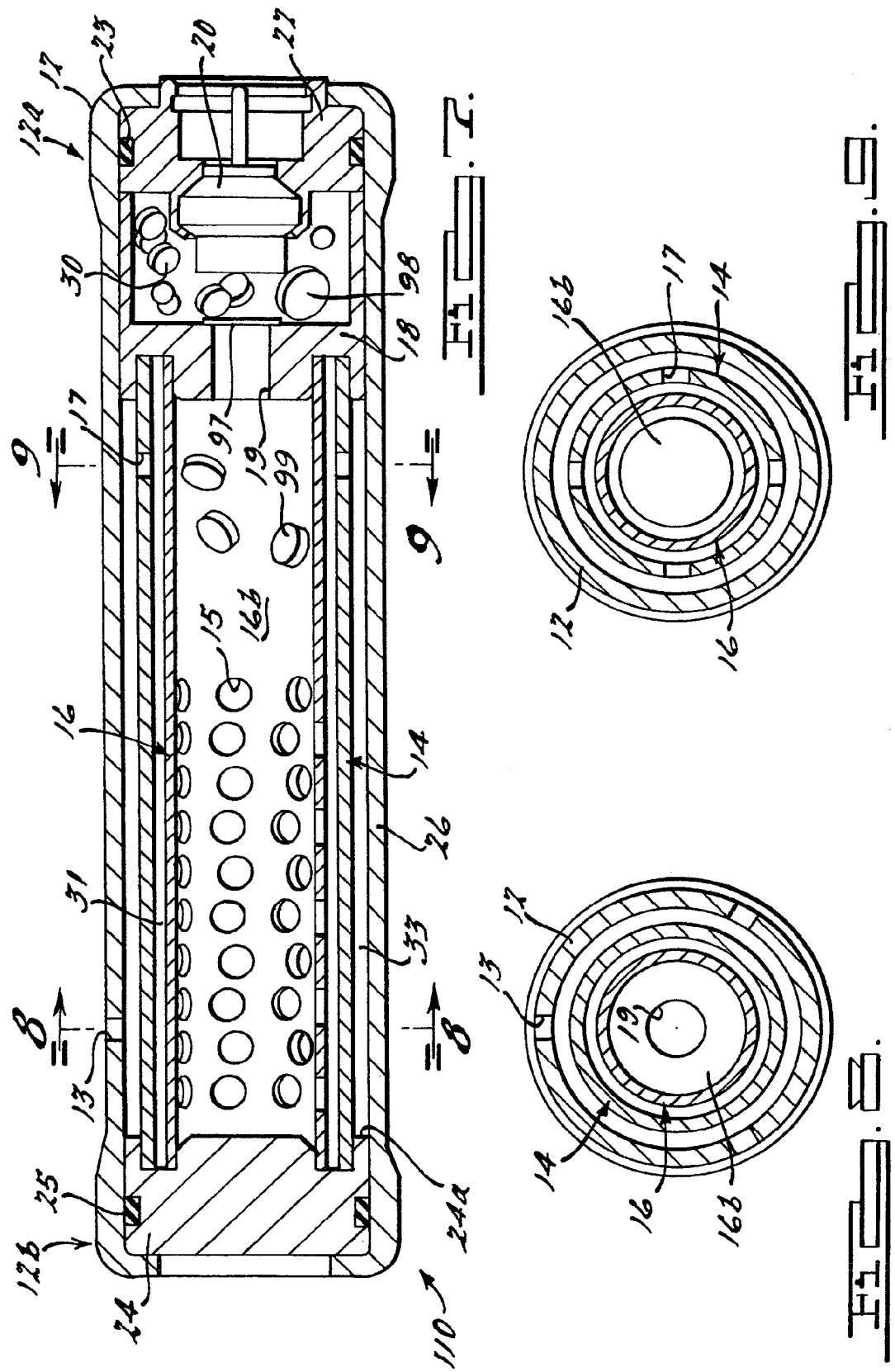

INFLATOR

CROSS-REFERENCE TO RELATED APPLICATIONS

This application claims the benefit of provisional application Ser. No. 60/530215 filed on Dec. 17, 2003.

BACKGROUND OF THE INVENTION

The present invention relates generally to inflators for use in inflatable occupant restraint systems in motor vehicles and, more particularly, to inflators that do not incorporate a filter for removal of particulates from combustion gases and cooling of the gases.

Installation of inflatable occupant restraint systems, generally known as "airbags," as standard equipment in all new vehicles has intensified the search for smaller, lighter and less expensive restraint systems. Accordingly, since the inflator used in such systems tends to be the heaviest and most expensive component, there is a need for a lighter and less expensive inflator.

A typical inflator includes a cylindrical steel or aluminum housing having a diameter and length related to the vehicle application and characteristics of a gas generant propellant contained therein. Inhalation by a vehicle occupant of particulates generated by propellant combustion during airbag activation can be hazardous. Thus, the inflator is generally provided with an internal, more rarely external, filter comprising one or more layers of steel screen of varying mesh and wire diameter. Gas produced upon combustion of the propellant passes through the filter before exiting the inflator. Particulate material, or slag, produced during combustion of the propellant in a conventional system is substantially removed as the gas passes through the filter. In addition, heat from combustion gases is transferred to the material of the filter as the gases flow through the filter. Thus, as well as filtering particulates from the gases, the filter acts to cool the combustion gases prior to dispersal into the airbag. However, inclusion of the filter in the inflator increases the complexity, weight, and expense of the inflator.

SUMMARY OF THE INVENTION

An inflator is provided for generating inflation gas for an inflatable element of a vehicle occupant restraint system. The inflator includes a housing having a housing interior cavity and one or more housing aperture(s) formed therealong to enable fluid communication between an interior of the housing and an exterior of the housing. A first baffle is positioned in the housing interior cavity. The baffle is spaced apart from the housing to define a fluid channel therebetween in communication with the housing aperture(s). The baffle includes a first opening to enable fluid communication between an interior of the baffle and the fluid channel, and a second opening to enable fluid communication between the baffle interior and an exterior of the baffle. A spacer is also positioned in the housing interior cavity. The spacer defines an enclosure and includes an aperture formed therein to enable fluid communication between the enclosure and the baffle second opening. A quantity of a gas generant composition is positioned within the spacer enclosure. The gas generant composition may be a smokeless gas generant composition. A quantity of gas generant may optionally be positioned in an interior of the baffle. An initiator is operatively coupled to the housing so as to enable fluid communication between the initiator and the spacer enclosure upon activation of the inflator, for initiating combustion of the gas generant composition upon activation of the inflator.

In another embodiment, a second, additional baffle is also positioned in the housing interior cavity. The second baffle is spaced apart from the first baffle to define a second fluid channel extending between the first baffle and the second baffle. The second fluid channel is in communication with the first opening of the first baffle. The second baffle includes one or more second baffle aperture(s) to enable fluid communication between an interior of the second baffle and the second fluid channel.

Use of a smokeless gas generant composition allows the inflator to operate without the need for a filter to remove particulate materials from the inflation gas. In addition, the inflator described herein provides a continuous fluid path for inflation gas that extends from the interior of the second baffle, through the fluid channel formed between the baffles, out the first baffle apertures and into the fluid channel formed between the first baffle and the housing, and exiting the inflator via the housing apertures. Thus, a tortuous flow path is provided for cooling the inflation gasses, obviating the need for a filter for cooling the gases.

BRIEF DESCRIPTION OF THE DRAWINGS

FIG. 7 is a cross-sectional side view of a second embodiment of an inflator in accordance with the present invention;

FIG. 8 is a cross-sectional end view of the inflator shown in FIG. 7 taken along line 8—8;

FIG. 9 is a cross-sectional end view of the inflator shown in FIG. 7 taken along line 9—9.

DETAILED DESCRIPTION

Figure 1:
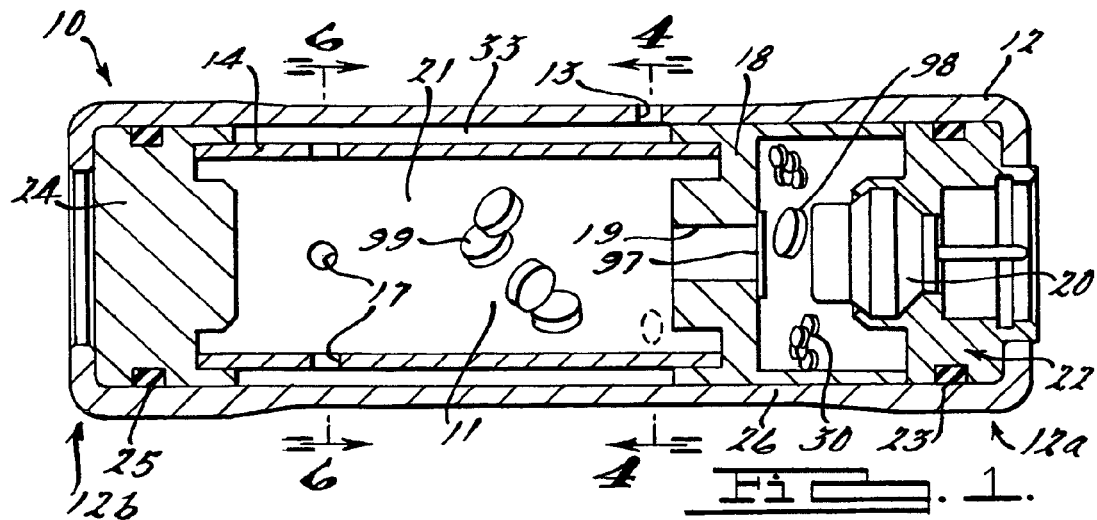
FIG. 1 is a cross-sectional side view of one embodiment of an inflator in accordance with the present invention.

FIG. 1 shows one embodiment of an inflator 10 in accordance with the present invention. Inflator 10 includes a substantially cylindrical housing 12 having a pair of opposed ends 12a, 12b and a wall 26 extending between the ends to define a housing interior cavity 21. Housing 12 is made from a metal or metal alloy and may be a cast, stamped, extruded, or otherwise metal-formed. A first end closure 22 is secured to end 12a of housing 12, and a second end closure 24 is secured to an opposite end 12b of housing 12 using one or more known methods. In FIG. 1, ends 12a and 12b of housing 12 are crimped over portions of first and second end closures 22, 24 to secure the end closures within the housing.

Figures 2, 3, 4:
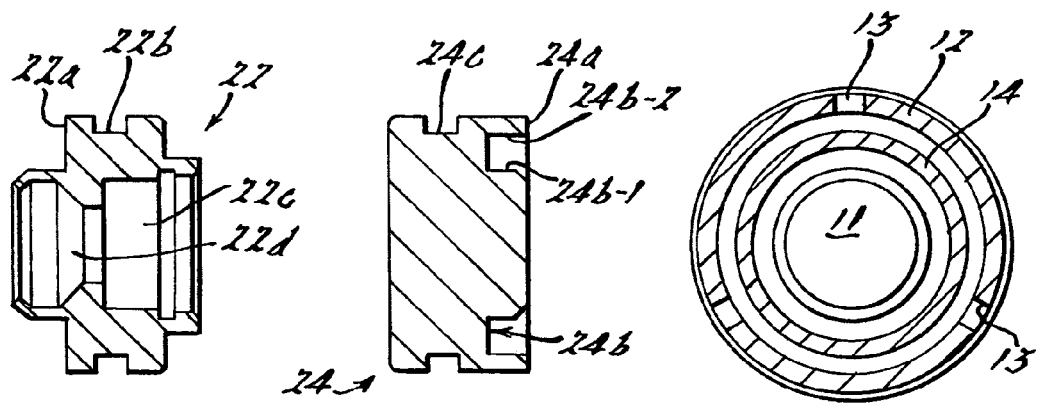
FIG. 2 is a cross-sectional side view of a first end closure in accordance with the present invention.
FIG. 3 is a cross-sectional side view of a second end closure in accordance with the present invention.
FIG. 4 is a cross-sectional end view of the inflator shown in FIG. 1 taken along line 4—4.

Referring to FIGS. 1 and 2, first end closure 22 has formed therein a peripheral shoulder 22a, a peripheral cavity 22b, a central cavity 22c, and a central orifice 22d for receiving end portions of the inflator components therein. Referring to FIG. 3, second end closure 24 has formed therein a circumferential shoulder 24a, an annular groove 24b adjacent shoulder 24a, and a peripheral cavity 24c. Annular groove 24b has an inner wall 24b-1 and an outer wall 24b-2 opposite the inner wall. Outer wall 24b-2 is dimensioned so that an end portion of a first cylindrical baffle 14 (described below) having a predetermined outer diameter will engage outer wall 24b-2 in an interference fit. Similarly, inner wall 24b-1 is dimensioned so that an end portion of a second cylindrical baffle 16 (described below) having a predetermined inner diameter will engage inner wall 24b-1 in an interference fit. End closures 22, 24 may be stamped, extruded, die cast, or otherwise metal formed and may be made from carbon steel or stainless steel, for example. A first O-ring or seal 23 is positioned in peripheral cavity 22b to seal the interface between first end closure 22 and housing wall 26. A second O-ring or seal 25 is positioned in peripheral cavity 24c to seal the interface between second end closure 24 and housing wall 26.

Referring again to FIG. 1, plurality of gas exit apertures 13 are formed in housing wall 26 to permit fluid communication between housing interior cavity 21 and an airbag (not shown). FIG. 4 shows one example of a suitable arrangement of housing apertures 13. FIG. 4 is a cross-section taken along line 4—4 of FIG. 1, and shows one row of housing apertures 13 spaced angularly apart approximately 120°. Those skilled in the art will appreciate that the disclosed aperture design, number, and spatial distribution might be varied without departing from the spirit and scope of the present invention.

Figure 5:
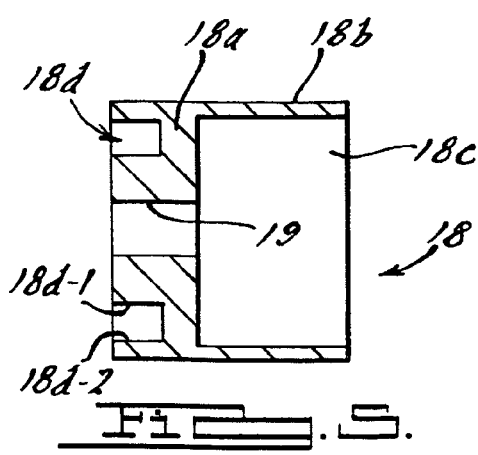
FIG. 5 is a cross-sectional side view of a spacer in accordance with the present invention.

Referring to FIGS. 1, 2, and 5, a spacer 18 is positioned in housing interior cavity 21. Spacer 18 has a base portion 18a and a wall 18b extending from the base portion to abut first end closure 22 along first end closure shoulder 22a. Base portion 18a and wall 18b define an enclosure 18c for containing a gas generant material 30 therein. At least one spacer aperture 19 is formed in base portion 18a to enable fluid communication between enclosure 18c and an exterior of the enclosure. In addition, an annular groove 18d is formed in spacer 18, within which end portions of first baffle 14 and second baffle 16 are positioned in a manner described in greater detail below.

Spacer groove 18d has an inner wall 18d-1 and an outer wall 18d-2 opposite the inner wall. Outer wall 18d-2 is dimensioned so that an end portion of a first cylindrical baffle 14 (described below) having a predetermined outer diameter will engage outer wall 18d-2 in an interference fit. Similarly, inner wall 18d-1 is dimensioned so that an end portion of a second cylindrical baffle 16 (described below) having a predetermined inner diameter will engage inner wall 18d-1 in an interference fit. Spacer 18 may be stamped, extruded, die cast, or otherwise metal formed and may be made from carbon steel or stainless steel, for example.

Referring again to FIGS. 1, 2, and 5, a quantity of a gas generant composition 30 is contained within spacer enclosure 18c. In one embodiment, gas generant 30 is a booster charge, whose combustion ignites a second, main gas generant charge (not shown) positioned elsewhere in housing 12. In an alternative embodiment, gas generant 30 in spacer enclosure 18c comprises the main gas generant charge for the inflator. This alternative embodiment may be used in applications in which a relatively small amount of inflation gas (and, therefore, a correspondingly smaller amount of gas generant) is needed. One or more autoignition tablets 98 may be placed in spacer enclosure 18c, allowing ignition of gas generant composition 30 upon external heating in a manner well known in the art.

One use of any of the embodiments of the inflator described herein is as a side impact inflator in inflatable vehicle occupant restraint systems. More particularly, inflators according to the present invention are applicable to airbag systems utilizing "smokeless" gas generant compositions, although the invention is not thereby limited. Suitable gas generants are exemplified by, but not limited to, compositions and processes described in U.S. Pat. Nos. 5,872,329, 6,074,502, 6,287,400, 6,306,232 and 6,475,312 incorporated by reference herein. As used herein, the term smokeless should be generally understood to mean such propellants as are capable of combustion yielding at least about 90% gaseous products based on a total product mass; and, as a corollary, less than about 10% solid products based on a total product mass. It has been generally found that filters as used in other inflator designs can be eliminated by using compositions having the described combustion characteristics. Other suitable compositions are set forth in the U.S. patent application Ser. Nos. 10/407,300 and 60/369,775, incorporated herein by reference. Use of smokeless gas generant composition allows the inflator to operate without the need for a filter to remove particulate materials from the inflation gas. It should be appreciated, however, that a filter might be disposed within or external to inflator 10 if desired, for example, in applications wherein a non-smokeless gas generant material is used.

Referring again to FIGS. 1, 2, and 5, inflator 10 also includes an initiator 20 coupled to housing 12 in a position that enables fluid communication between the initiator and spacer enclosure 18c (FIG. 5) upon activation of the inflator, for initiating combustion of gas generant composition 30 upon activation of the inflator. In one embodiment, initiator 20 is secured in central cavity 22c (FIG. 2) of first end closure 22 and extends into spacer chamber 18c. Initiator 20 may be secured in first end closure central orifice 22d by the use of crimping, fasteners, or other known methods. On example of an initiator suitable for use in the inflator of the present invention is described in U.S. Pat. No. 6,009,809, incorporated herein by reference.

A rupturable, fluid-tight seal 97 may be positioned across spacer aperture 19 to fluidly isolate spacer enclosure 18c during gas generant activation, accommodating a resident interim gas pressure therein in a manner known in the art. The seal is secured to spacer 18 and is in communication with an exterior of the spacer and forms a fluid-tight barrier between spacer enclosure 18c and an exterior of the spacer. Various disks, foils, films, etc. may be used to form the seal.

Referring again to FIG. 1, a substantially cylindrical first baffle 14 is positioned within housing interior cavity 21 and spaced apart from housing 12 to define a fluid channel 33 therebetween. First baffle 14 defines an interior cavity 11 of baffle 14 and has one or more gas exit apertures 17 formed therealong to enable fluid communication between interior cavity 11 and an exterior of the baffle. First baffle 14 is open at either end to enable fluid communication between interior cavity 11 and an exterior of the baffle.

Figure 6:
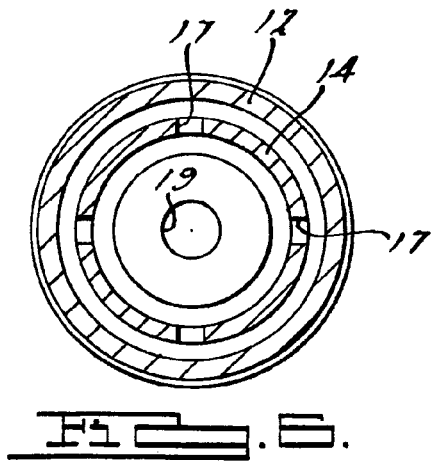
FIG. 6 is a cross-sectional end view of the inflator shown in FIG. 1 taken along line 6—6.

Fluid channel 33 connects first baffle apertures 17 with apertures 13 formed in inflator body 12. FIG. 6 shows one example of a suitable arrangement of first baffle apertures 17 along first baffle. FIG. 6 is a cross section taken along line 6—6 of FIG. 1, and shows a row of apertures 17 spaced angularly apart approximately 90°. Those skilled in the art will appreciate that the disclosed aperture design, number, and spatial distribution might be varied without departing from the spirit and scope of the present invention.

Referring to FIGS. 1 and 7–9, in one alternative embodiment of the inflator, a substantially cylindrical second baffle 16 is positioned in housing interior cavity 21. Second baffle defines an interior cavity 16b and includes a plurality of apertures 15 formed therealong to enable fluid communication between interior cavity 16b and an exterior of second baffle 16. In the embodiment shown, second baffle 16 is positioned substantially within first baffle interior cavity 11 (FIG. 1). In a particular embodiment, second baffle 16 is positioned coaxially with the first baffle. At least a portion of second baffle 16 is spaced apart from first baffle 14 to define a second fluid channel 31 between first baffle 14 and second baffle 16. Second fluid channel 31 connects apertures 15 in second baffle 16 with apertures 17 in first baffle 14. Baffles 14 and 16 may be extruded or roll-formed and pierced, or otherwise metal formed, and may be made from aluminum or stainless steel, for example. FIGS. 8 and 9 show inflator 110 with second baffle 16 positioned in a coaxial relationship with housing 12 and first baffle 14.

Both embodiments (i.e., using either one baffle or a plurality of baffles) offer advantages over known designs. Rather than utilizing a metallic mesh or wool filter, etc., inflators constructed according to the present invention use one or more baffles to cool the inflation gas and filter solid particulates from the gas stream. The choice of the number of baffles used will vary depending on such factors as propellant type, propellant load, and the chosen application for the inflator; however, the number of baffles can be from one to a plurality thereof.

Referring again to FIGS. 1, 5, and 7, a quantity of a second, gas generant composition 99 may optionally be positioned in housing interior cavity 21. The second gas generant composition is ignited by combustion products emanating from spacer enclosure 18c (FIG. 5) following combustion of gas generant composition 30 contained in spacer enclosure 18c. In an embodiment where only first baffle 14 is positioned within housing 12, the second gas generant would be positioned in first baffle interior cavity 11, with spacer aperture 19 in fluid communication with first baffle interior cavity 11. In an embodiment where a second baffle 16 is positioned within housing 12, the second gas generant 99 would be positioned in second baffle interior cavity 16b (FIG. 7), with spacer aperture 19 in fluid communication with second baffle interior cavity 16b. The second gas generant 99 composition may comprise a smokeless composition identical to, or different from, gas generant composition 30 positioned in spacer enclosure 18c. Alternatively, the second gas generant composition 99 may be one of many suitable known non-smokeless compositions.

Referring again to FIG. 7, to assemble gas generator 110, second end closure 24 is positioned and secured within housing wall 26, and an end portion of wall 26 is then crimped over second end closure 24 to secure the end closure in position. An end portion of first baffle 14 is press-fit into spacer groove 18d, along outer wall 18d-2, thereby forming a baffle sub-assembly. If a second baffle 16 is to be employed, second baffle 16 is also press-fit into spacer groove 18d, along inner wall 18d-1, as part of the baffle sub-assembly. If a second gas generant composition is to be used, it is positioned in either first baffle interior cavity 11 (if only first baffle 14 is used) or in second baffle interior cavity 16b (if second baffle 16 is also used). The baffle sub-assembly is then inserted into housing 12, wherein opposite end portions of baffles 14 and 16 are press-fit into second end closure groove 24b, along the corresponding inner surface 24b-1 and outer surface 24b-2 of groove 24b. In this manner, first end closure 24 and spacer 18 act to position and secure baffles 14 and 16 in position within housing 12. Gas generant 30 may then be positioned in spacer enclosure 18c. First end closure 22 containing the igniter 20 press-fit, crimped or otherwise fixed within cavity 22d, is then positioned abutting spacer wall 18b, and end portions of housing 12 are crimped over first end closure 22 to secure the end closure in position.

Operation of the inflator will now be discussed with regard to FIG. 7. Upon activation of the inflator, initiator 20 ignites gas generant composition 30 contained in spacer enclosure 18c. Combustion products generated by combustion of gas generant 30 propagate through spacer aperture 19 to ignite a second gas generant composition (if any) contained within baffle first baffle 14. When elements of the inflator are positioned in housing 12 as shown in FIG. 7, there is a continuous fluid path for inflation gas that extends from second baffle interior cavity 16b through second baffle apertures 15, thence through fluid channel 31, then through first baffle apertures 17, through fluid channel 33, and out of the inflator via housing apertures 13. Thus, the system of baffles and fluid channels described above defines a tortuous flow path for cooling and regulating the combustion gasses. As stated previously, use of a smokeless gas generant composition allows the inflator to operate without the need for a filter to remove particulate materials from the inflation gas. It should be appreciated, however, that a filter might be disposed within or external to inflator 10 if desired, for example, in applications wherein a smoke-producing gas generant material is used. In an embodiment where a filter is used, the baffles, in conjunction with the filters, aid in preventing the escape of undesirable combustion products from housing member 12 during airbag deployment. Operation of the embodiment shown in FIG. 1 is the same as for the embodiment shown in FIG. 7, with the exception of passage of the inflation gas through fluid channel 31, as the embodiment of FIG. 1 does not incorporate second baffle 16.

Figure 10:
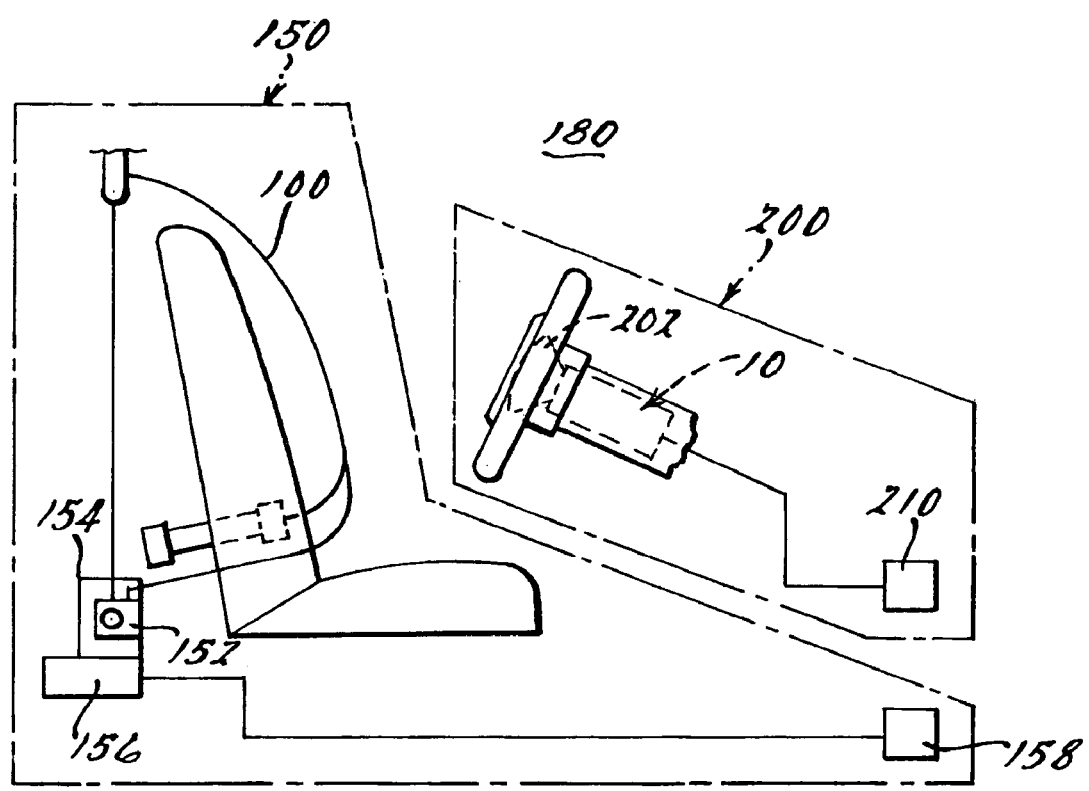
FIG. 10 is a schematic representation of an exemplary vehicle occupant restraint system incorporating an inflator in accordance with the present invention.

Referring now to FIG. 10, any of the inflator embodiments described above may also be incorporated into an airbag system 200. Airbag system 200 includes at least one airbag 202 and an inflator 10 (in accordance with the present invention) coupled to airbag 202 so as to enable fluid communication with an interior of the airbag. Airbag system 200 may also include (or be in communication with) a crash event sensor 210. Crash event sensor 210 operates in conjunction with a known crash sensor algorithm that signals actuation of airbag system 200 via, for example, activation of airbag inflator 10 in the event of a collision.

Referring again to FIG. 10, airbag system 200 may also be incorporated into a broader, more comprehensive vehicle occupant restraint system 180 including additional elements such as a safety belt assembly 150. FIG. 10 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553, 803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of various embodiments of the present invention are for illustrative purposes only. As such, the various structural and operational features disclosed herein are susceptible to a number of modifications, none of which departs from the scope of the present invention as defined in the appended claims.

The invention claimed is:

1. An inflator comprising:
 a housing defining a housing interior cavity, the housing including at least one housing aperture formed therealong to enable fluid communication between the interior cavity and an exterior of the housing;
 a first baffle positioned in the housing interior cavity, at least a portion of the first baffle being spaced apart from the housing to define a fluid channel therebetween in communication with the at least one housing aperture, the first baffle defining a first baffle interior cavity, the first baffle including a first opening to enable fluid communication between the first baffle interior cavity and the fluid channel;
 a spacer positioned in the housing interior cavity, the spacer defining an enclosure, the spacer having at least one spacer aperture formed therein to enable fluid communication between the enclosure and the first baffle interior cavity;
 a quantity of a gas generant composition contained within the spacer enclosure; and
 an initiator in fluid communication with the gas generant composition and operatively coupled to the housing so as to enable fluid communication between the initiator and the spacer enclosure upon activation of the inflator, for initiating combustion of the gas generant composition upon activation of the inflator.

2. The inflator of claim 1 wherein the spacer has a base portion and a wall extending from the base portion, the base portion and the wall defining the enclosure, and wherein the spacer aperture is formed in the base portion.

3. The inflator of claim 1 further comprising a second baffle positioned in the first baffle interior cavity, at least a portion of the second baffle being spaced apart from the first baffle to define a second fluid channel extending between the first baffle and the second baffle, the second fluid channel being in communication with the first opening of the first baffle, the second baffle defining a second baffle interior cavity, the second baffle including at least one second baffle aperture formed therealong to enable fluid communication between the second baffle interior cavity and the second fluid channel.

4. The inflator of claim 3 wherein the second baffle is positioned coaxially with the first baffle.

5. The inflator of claim 4 wherein at least a portion of the second baffle is positioned in the first baffle interior cavity.

6. The inflator of claim 1 wherein the spacer includes a groove for receiving a portion of the first baffle therein, for positioning and securing the first baffle within the housing.

7. The inflator of claim 3 wherein the spacer includes a groove for receiving a portion of the second baffle therein, for positioning and securing the second baffle within the housing.

8. The inflator of claim 3 wherein at least a portion of the second baffle is positioned within the first baffle interior cavity.

9. The inflator of claim 1 wherein the initiator extends into the spacer enclosure.

10. The inflator of claim 1 wherein the gas generant composition is a smokeless gas generant composition.

11. The inflator of claim 1 wherein a portion of the housing includes a groove for receiving a portion of the baffle therein, for positioning and securing the baffle within the housing.

12. The inflator of claim 1 further comprising a quantity of a second gas generant composition positioned in the baffle interior cavity, wherein activation of the initiator ignites the first gas generant composition and ignition of the first gas generant composition ignites the second gas generant composition.

13. The inflator of claim 12 wherein the second gas generant composition is a smokeless gas generant composition.

14. The inflator of claim 1 further comprising an autoignition material positioned in the spacer enclosure proximate the gas generant composition.

15. The inflator of claim 1 further comprising a rupturable, fluid-tight seal positioned to seal the spacer aperture.

16. An airbag system comprising at least one airbag and an inflator coupled to the airbag so as to enable fluid communication with an interior of the airbag upon activation of the inflator, the inflator including:
 a housing including at least one housing aperture formed therealong to enable fluid communication between an interior of the housing and an exterior of the housing;
 a baffle positioned in the housing interior, at least a portion of the baffle being spaced apart from the housing to define a fluid channel therebetween in communication with the at least one housing aperture, the baffle including a first opening to enable fluid communication with the fluid channel;
 a spacer positioned in the housing interior, the spacer defining an enclosure, the spacer having at least one spacer aperture formed therein to enable fluid communication between the enclosure and an interior of the baffle;
 a quantity of a gas generant composition contained within the spacer enclosure; and
 an initiator in fluid communication with the gas generant composition for initiating combustion of the gas generant composition upon activation of the inflator.

17. The airbag system of claim 16 further comprising a crash event sensor in operative communication with the inflator, thereby actuating the airbag system in the event of a collision.

18. The airbag system of claim 16 wherein the gas generant composition is a smokeless gas generant composition.

19. A vehicle occupant restraint system comprising:
 a safety belt assembly including a first housing and a safety belt extending from the first housing, and an air bag system including at least one airbag and an airbag inflator coupled to the airbag so as to enable fluid communication with an interior of the airbag for inflating the airbag in the event of a collision, the inflator comprising:

a second housing including at least one housing aperture formed therealong to enable fluid communication between an interior of the second housing and an exterior of the second housing;

a first baffle positioned in the second housing interior, at least a portion of the baffle being spaced apart from the second housing to define a fluid channel therebetween in communication with the at least one housing aperture, the baffle including a first opening to enable fluid communication with the fluid channel;

a spacer positioned in the second housing interior, the spacer defining an enclosure, the spacer having at least one spacer aperture formed therein to enable fluid communication between the enclosure and an interior of the baffle;

a quantity of a gas generant composition contained within the spacer enclosure; and an initiator in fluid communication with the gas generant composition for initiating combustion of the gas generant composition upon activation of the inflator.

20. The vehicle occupant restraint system of claim 19 wherein the gas generant composition is a smokeless gas generant composition.

* * * * *